United States Patent
Marumori et al.

(10) Patent No.: US 7,136,337 B2
(45) Date of Patent: *Nov. 14, 2006

(54) APPARATUS FOR RECORDING OF INFORMATION

(75) Inventors: Hiroyuki Marumori, Yokohama (JP); Junji Shiokawa, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 286 days.

This patent is subject to a terminal disclaimer.

(21) Appl. No.: 10/830,545

(22) Filed: Apr. 22, 2004

(65) Prior Publication Data

US 2004/0264331 A1    Dec. 30, 2004

Related U.S. Application Data

(63) Continuation of application No. 09/944,755, filed on Aug. 31, 2001, now Pat. No. 6,894,960.

(30) Foreign Application Priority Data

Jun. 28, 2001  (JP)  ............................. 2001-195691

(51) Int. Cl.
*G11B 11/03*  (2006.01)

(52) U.S. Cl. .................................... 369/53.11; 369/100
(58) Field of Classification Search .................... None
See application file for complete search history.

(56) References Cited

U.S. PATENT DOCUMENTS 6,463,022 B1 * 10/2002 Ito et al. .................. 369/53.24

FOREIGN PATENT DOCUMENTS

| JP | 05-054518 | 3/1993 |
|----|-----------|--------|
| JP | 08-273304 | 10/1996 |

* cited by examiner

*Primary Examiner*—Paul Huber
(74) *Attorney, Agent, or Firm*—Townsend and Townsend and Crew LLP

(57) ABSTRACT

With an object of executing excellent finishing processing when information is recorded to a rewritable type record medium or a write once type record medium, the finishing processing is switched by whether a kind of a medium for recording information is the rewritable type record medium or the write once type record medium and a method of executing the finishing processing is switched based on a state of supplying power.

2 Claims, 11 Drawing Sheets

FIG. 2
BEFORE FINALIZING
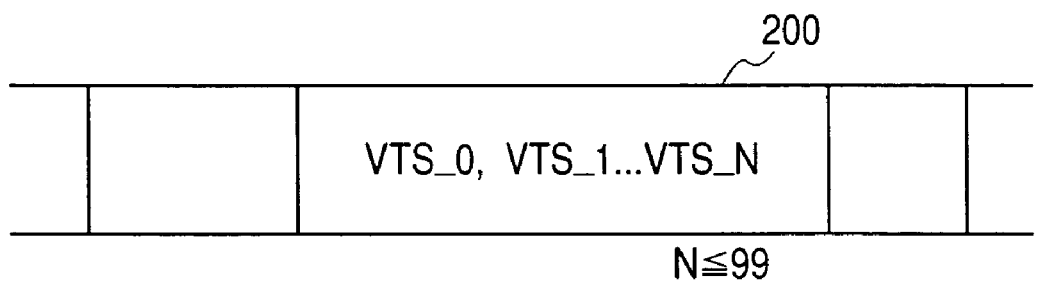
N≦99
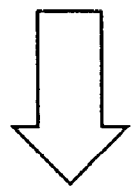
AFTER FINALIZING
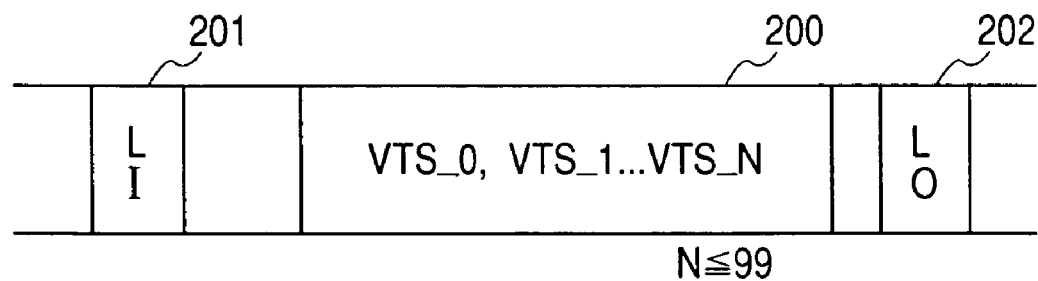
N≦99

APPARATUS FOR RECORDING OF INFORMATION

CROSS-REFERENCES TO RELATED APPLICATIONS

The present application is a Continuation Application of U.S. application Ser. No. 09/944,755, Filed Aug. 31, 2001, now U.S. Pat. No. 6,894,960 which is related to and claims priority from Japanese Application No. 2001-195691, Filed Jun. 28, 2001, each of which are incorporated by reference herein in its entirety for all purposes.

BACKGROUND OF THE INVENTION

The present invention relates to a technology of recording information to a rewritable type record medium or a write once type record medium.

As a record medium for recording information taken by a video camera, a medium using a magnetic tape has generally been used. In contrast thereto, by development of recording and reproducing technology to and from a record medium in a disk-like shape and a technology of high density formation thereof, the record medium in the disk-like shape has been reduced into practice as a record medium. As an example thereof, there appears also a video camera for an information recording apparatus using a hard disk or an optical disk (DVD disk or the like) as a record medium. A video camera, an information recording apparatus or an information reproducing apparatus using the disk-like record medium achieves advantages such that random access or various editions can readily be carried out and small-sized formation of a record medium can be carried out in comparison with a conventional constitution using a magnetic tape for a record medium.

BRIEF SUMMARY OF THE INVENTION

However, DVD-RAM is not provided with a compatibility with a DVD-video format. That is, reproduction thereof cannot be executed by an existing DVD reproducing apparatus. Further, a medium of DVD-RAM per se is still expensive and a rate of spreading an RAM exclusive reproducer and a DVD reproducing apparatus in correspondence with RAM is not large in the current state. It is easily predicted also in view of the spreading rate that reproduction by the DVD reproducing apparatus is indispensable. Then, there is brought about a necessity of reproducing a medium recorded by a DVD-RAM camera by the existing DVD reproducing apparatus. Although format of a recording type is provided with a choice of DVD-RW and DVD-R, DVD-R wins in view of the cost of the disk and reproducability by the existing DVD reproducing apparatus. As described above, in consideration of the marketability, it is indispensable to provide a recording function of DVD-R to the DVD-RAM camera.

Meanwhile, there are a rewritable type and a write once type in record media of optical disks. The rewritable one can rewrite information as the name signifies. Meanwhile, the write once type one can write information only once. As the rewritable ones, there are known DVD-RAM, DVD-RW, PC-RW or the like and as the write once type, DVD-R is known. Although either of the information record media can record information, a method of recording information differs by respective characteristics and accordingly, an information recording apparatus needs to record information based on the recording method.

DVD-R can record information by UDF bridge format the same as that of a reproduction exclusive disk. Therefore, with regard to reproduction after recording, DVD-R can be reproduced by an existing DVD reproducing apparatus since DVD-R is provided with the characteristic substantially the same as that of a reproduction exclusive disk.

However, in order to reproduce information recorded in DVD-R by the existing DVD reproducing apparatus, a finishing processing including finalizing must be executed. A description will be given later of details of finalizing. The finalizing processing is not needed in DVD-RAM. Therefore, according to a video camera or an information recording apparatus for recording information to DVD-R and DVD-RAM, the finishing processing after recording must be switched by the media. The finishing processing of DVD-RAM is a processing of writing information in conformity with video recording standards to the disk in order to realize special reproduction of taken video. Meanwhile, the finishing processing of DVD-R is writing of information and a finalizing processing in conformity with a video format of a reproduction exclusive disk prescribed in DVD-video book. A logical format of DVD is described in Japanese Patent Laid-Open No. 274403/1996.

Next, a simple explanation will be given of finalizing record in reference to FIG. 2.

FIG. 2 is a diagram for explaining finalizing record. VTS_0, VTS_1 of 200 is a set of data of video, audio, sub audio or the like and control information thereof, LI of 201 designates an area recorded with a capacity of data in a read-in area and 202 designates an area showing a finish position of record data. As shown by FIG. 2, when information is recorded to DVD-R, the information is recorded by a unit referred to as VTS (video title set: maximum 99 pieces) 200. VTS 200 is formed by data packaging compressed video, audio or sub video, information for reproducing thereof and backup of the information for reproducing thereof. Upper stage of FIG. 2 shows a recording state before finalizing. In the state before finalizing, information cannot be reproduced by the existing DVD reproducing apparatus and therefore, in order to make the information reproducible, the read-in area 201 and a read-out area 202 are recorded as shown at a lower stage of FIG. 2. Although not illustrated in FIG. 2, information with regard to video manager information (information for searching title) and information with regard to volume and file structure area are simultaneously recorded between the read-in area and VTS 200. Further, there also is a case in which information for utilizing the title set is provided between VTS 200 and the read-out area 202. A description is given in Japanese Patent Laid-Open No. 273304/1996 with regard to a detailed constitution of data. By recording information by the format explained above, the information can be reproduced by existing DVD reproducing apparatus.

Further, when a video camera is used, normally, a battery (a charging battery referred to as a battery pack or dry cell) is used, first of all, a suppliable power amount of the battery (charging battery, dry cell, solar cell or the like) is limited or the suppliable power amount is changed by environmental conditions of temperature, sunshine condition and the like. For example, there is a case in which the suppliable power amount becomes smaller than a power amount necessary for executing finalizing processing by temperature drop.

When the power amount necessary for executing the finalizing processing cannot be supplied in the finalizing processing since the battery is dead, the finalizing processing cannot normally be processed.

Further, at that occasion, there is conceivable a case in which although the finalizing processing is being executed, the processing is forcibly finished and information recorded in the disk cannot be reproduced or the disk is destructed. Further, particularly in the case of DVD-R, information can be written thereto only once and therefore, it is a serious problem for the information recording apparatus dealing with DVD-R that the finalizing processing cannot be executed normally.

Therefore, it is an object of the invention to provide an information recording apparatus capable of excellently writing information to a rewritable or a write once type record medium and it is an object thereof to prevent the finalizing processing or record medium from being failed.

Further, there is pointed out Japanese Patent Laid-Open NO. 54518/1993 as a reference example of an optical disk recording apparatus posing a problem caused by lowering of power supply voltage.

The publication discloses a technology stating "By such constitution, even when voltage of a battery 31 is lowered during recording (recording sound), TOC information of a recorded content up to the moment is stored and held and the TOC information is recorded to an optical disk 2 when the main power supply recovers and accordingly, the recorded content immediately before shutting down the main power supply can later be reproduced. This is because conventionally, when recording is interrupted in the midst of recording, the TOC information is not recorded to the disk, head access for reproducing audio data which is not recorded with the TOC information cannot be executed and the audio data cannot be reproduced and therefore, there has been a drawback that the audio data is not substantially recorded for a user, however, according to the embodiment of the invention, the TOC information is reserved until immediately before interrupting the recording by shutting down the power supply and therefore, all of recorded content up to the moment can be reproduced. (paragraph No.: 0021)".

According to the publication, it is the object "to enable reproduction of all of the recorded content up to the moment since the TOC information is preserved up to immediately before interrupting recording by shutting down the power supply" for avoiding "conventionally, the TOC information is not recorded to the disk when recording is interrupted in the midst of recording and head access for reproducing audio data which is not recorded with the TOC information cannot be carried out and the audio data cannot be reproduced".

That is, the publication is characterized in that when the power supply is shut down, in the case in which means for providing the TOC information of the recorded content until recording is not provided, the information is erased by shutting down the power supply and accordingly, the TOC information is made to store to RAM 9 to preserve and is prevented from being erased.

Meanwhile, the problem posed by the invention is that as described above, the finalizing processing is forcibly finished although the finalizing processing is being executed and information recorded in the disk cannot be reproduced or the disk is destructed, which is not described in the publication.

Further, no description is given to that the finalizing processing cannot normally be executed in the case of DVD-R which can be written with information only once.

In order to achieve the above-described problem, according to the invention, a kind of a record medium constituting a record object is determined and a finishing processing is switched for respective record media such that the finishing processing in correspondence with respectives of kinds of the record media is executed. Or, the finishing processing is switched in correspondence with a method of recording information to the record medium.

A finishing processing of a rewritable type record medium such as DVD-RAM, is executing a processing of writing information in conformity with video recording standards to a disk in order to realize special reproduction of taken video.

Meanwhile, a finishing processing of a write once type record medium such as DVD-R is executing writing of information and a finalizing processing in conformity with a video format of a reproduction exclusive disk prescribed in DVD-video book.

Further, when the information recording apparatus executes the finishing processing, the finishing processing is executed when a necessary power amount is suppliable by determining whether the power amount necessary for executing the finishing processing can be supplied.

In determining whether the power amount necessary for executing the finishing processing can be supplied, the determination can be executed firstly by determining whether power is supplied by a battery or supplied by a commercial alternating current power supply.

That is, when the power is supplied by the commercial alternating current power supply, the finishing processing is executed such that the power amount necessary for executing the finishing processing can be supplied. Therefore, when the power is supplied by the battery, the finishing processing cannot be executed.

However, even when power is supplied by a battery, in the case in which a power amount suppliable by the battery for supplying power is determined and the power amount necessary for executing the finishing processing can be supplied (for example, the power amount suppliable by the battery is larger than a power amount used for the finishing processing), the finishing processing can be executed.

In executing the finishing processing after recording information to a write once type record medium such as DVD-R according to the invention, particularly in the case of executing a finalizing processing, it is determined whether a power amount necessary for executing the finalizing processing can be supplied and when the necessary power amount can be supplied, the finalizing processing is executed. Also in this case, the above-described means is used for determining whether the power amount necessary for executing the finalizing processing can be supplied.

Further, although when power is supplied by the commercial alternating current power supply in the above-described, the finishing processing is executed, the commercial alternating current power supply is exemplified as an example in which the suppliable power amount is not limited in contrast to the power supply in which the suppliable power amount is limited as in the battery (charging battery, dry cell or the like). Therefore, when there is other power supply in which the suppliable power amount is not limited, the power supply can be used as a power supply source executing the finishing processing. For example, power provided from an automobile may be used as a power supply source. Further, although the battery is a charging battery or a dry cell, the battery exemplifies a power supply in which suppliable power amount is limited, for example, a solar cell or the like can sufficiently realize a constitution used for power supply as the above-described battery and can execute the invention, however, in accordance with the magnitude of the suppliable power amount, there is a case in which the finishing processing cannot be executed.

Further, although in the case of the battery (charging battery, dry cell, solar cell or the like), the suppliable power amount is limited, the battery is provided with a characteristic having a case in which the suppliable power amount is changed by environmental conditions such as temperature, sunshine condition and the like.

Meanwhile, according to the commercial alternating current power supply, the suppliable power amount is not limited and normally, power can stably be supplied and supplied power is difficult to change by environmental conditions as in the battery.

Therefore, even in consideration of a variation of power supplied on an average, when power is supplied from the commercial alternating current power supply, the finishing processing is executed, data recorded in the information recording apparatus is protected, further, promotion of reliability of the information recording apparatus is achieved.

However, even in the case of supplying power from the battery, when power necessary for finishing processing can stably be supplied by detecting stability of supplied power, the finishing processing may be executed.

Further, in detecting or determining that power necessary for the finishing processing can be supplied, power can be determined to be suppliable stably when a change in power over time is stable. For example, it is possible that a state and a characteristic of the change of the supplied power is calculated by continuously or discretely referring to power supplied from the battery over time, power necessary for the finishing processing is detected or determined to be stably suppliable based on the state and the characteristic of the change.

Further, in detecting or determining stability of power supply based on the state and the characteristic of the change, detection or determination may be executed by referring to the characteristic of the battery (including discharge characteristic) or providing a sensor or means for measuring the environmental conditions such as measuring or referring to temperature change by a temperature sensor or measuring or referring to sunshine condition by a sensor with regard to light.

Further, in order to achieve the above-described problem, according to the invention, there is constituted a (camera integral type) information recording apparatus having video compressing means for compressing an video signal, audio signal compressing means for compressing an audio signal, multiplexing means for multiplexing video data outputted by the video compressing means and audio data outputted by the audio compressing means in a predetermined style, determining means for determining a kind of a record medium, reading/writing means for writing or reading information in accordance with the medium, power supply means for driving the apparatus, controlling means for controlling the information recording apparatus starting from a start timing and a finish timing of recording and monitoring or determining a connected state of the power supply, finishing means for executing a finishing processing in conformity with standards of the record medium based on control of the controlling means and informing means for informing an alarm message. Further, monitoring or determining the connected state of the power supply may not necessarily be executed by the controlling means and executing means may separately be provided.

Further, in order to achieve the above-described object, according to an aspect of the invention, there is provided an information recording apparatus which is an information recording apparatus for recording information to a record medium, the information recording apparatus comprising driver means for writing and reading the information to and from the record medium, record medium determining means for determining a kind of the record medium, finishing processing means for executing a finishing processing of the record medium via the driver means, and controlling means for controlling the information recording apparatus, wherein the finishing processing means switches the finishing processing based on the kind of the record medium.

Further, in order to achieve the above-described object, according to another aspect of the invention, the record medium is a rewritable type record medium or a write once type record medium.

Further, in order to achieve the above-described object, according to another aspect of the invention, there is provided the information recording apparatus, further comprising power supplying means for supplying power to the information recording apparatus, and power supply determining means for determining a state of supplying of the power supplying means, wherein the power supply determining means determines whether the power is supplied by a battery or supplied by a commercial alternating current power supply, and when the power is supplied by the commercial alternating current power supply, the finishing processing means executes the finishing processing.

Further, in order to achieve the above-described object, according to another aspect of the invention, there is provided the information recording apparatus, further comprising power supplying means for supplying power to the information recording apparatus, and power supply determining means for determining a state of supplying of the power supplying means, wherein the power supply determining means determines whether the power is supplied by a battery or supplied by a commercial alternating current power supply, and when the power is supplied by the battery, the finishing processing means does not execute the finishing processing.

Further, in order to achieve the above-described object, according to another aspect of the invention, there is provided the information recording apparatus, further comprising power supplying means for supplying power to the information recording apparatus, and power supply determining means for determining a state of supplying of the power supplying means, wherein the power supply determining means determines a power amount suppliable by a battery for supplying the power, and when the power amount suppliable by the battery is larger than a power amount used in the finalizing processing, the finishing processing means executes the finishing processing.

Further, in order to achieve the above-described object, according to another aspect of the invention, there is provided the information recording apparatus, further comprising informing means, wherein the informing means informs that the power is supplied by the commercial alternating current power supply.

Further, in order to achieve the above-described object, according to another aspect of the invention, there is provided an information recording apparatus which is an information recording apparatus for recording information to a rewritable type record medium or a write once type record medium, the information recording apparatus comprising driver means for writing and reading the information to and from the record medium, record medium determining means for determining whether a kind of the record medium is the rewritable type record medium or the write once type record medium, finishing processing means for executing a finishing processing to the rewritable type record medium or the write once type record medium via the driver means, and controlling means for controlling the information recording apparatus, wherein based on a determination of the record medium determining means, the finishing processing means switches the finishing processing by whether the record medium is the rewritable type record medium or the write once type record medium.

Further, in order to achieve the above-described object, according to another aspect of the invention, there is provided an information recording apparatus which is an information recording apparatus for recording information to a write once type record medium, the information recording apparatus comprising driver means for writing and reading the information to and from the write once type record medium, finishing processing means for executing a finishing processing based on a method of recording the information to the write once type record medium via the driver means, power supply means for supplying power to the information recording apparatus, power supply determining means for determining a state of supplying the power supply means, and controlling means for controlling the information recording apparatus, wherein the power supply determining means determines whether the power is supplied by a battery or supplied by a commercial alternating current power supply, and when the power is supplied by the commercial alternating current, the finishing processing means executes the finishing processing.

Further, in order to achieve the above-described object, according to another aspect of the invention, there is provided an information recording apparatus which is an information recording apparatus for recording information to a write once type record medium, the information recording apparatus comprising driver means for writing and reading the information to and from the write once type record medium, finishing processing means for executing a finishing processing based on a method of recording the information to the write once type record medium via the driver means, power supply means for supplying power to the information recording apparatus, power supply determining means for determining a state of supplying the power supply means, and controlling means for controlling the information recording apparatus, wherein the power supply determining means determines whether the power is supplied by a battery or supplied by a commercial alternating current power supply, and when the power is supplied by the battery, the finishing processing means does not execute the finishing processing.

Further, in order to the above-described object, according to another aspect of the invention, there is provided an information recording apparatus which is an information recording apparatus for recording information to a write once type record medium, the information recording apparatus comprising driver means for writing and reading the information to and from the write once type record medium, finishing processing means for executing a finishing processing based on a method of recording the information to the write once type record medium via the driver means, power supply means for supplying power to the information recording apparatus, power supply determining means for determining a state of supplying the power supply means, and controlling means for controlling the information recording apparatus, wherein the power supply determining means determines a power amount suppliable by a battery for supplying the power, and wherein when the power amount suppliable by the battery is larger than a power amount used in the finishing processing, the finishing processing means executes the finishing processing.

Further, in order to achieve the above-described object, according to another aspect of the invention, there is provided the information processing apparatus for recording the information to a rewritable type record medium or a write once type record medium, further comprising power supply monitoring means for monitoring means for supplying a power supply to the information recording apparatus, wherein when the power supply monitoring means determines that the power is supplied by an AC power supply, the finishing processing means executes the finishing processing to the write once type record medium.

Further, in order to achieve the above-described object, according to another aspect of the invention, there is provided the information recording apparatus for recording the information to the rewritable type record medium or the write once type record medium, further comprising informing means, wherein when the power supply monitoring means determines that the power is supplied by a battery, the finishing processing means does not execute the finishing processing to the write once type record medium, and the informing means informs that the power is supplied by the AC power supply.

BRIEF DESCRIPTION OF THE DRAWINGS

FIG. 2 is a diagram for explaining finalizing;

DETAILED DESCRIPTION OF THE INVENTION

An explanation will be given of a first embodiment in reference to FIG. 1. As a system of the embodiment, there is constituted a system capable of recording two optical disks of DVD-RAM and DVD-R.

Figure 1:
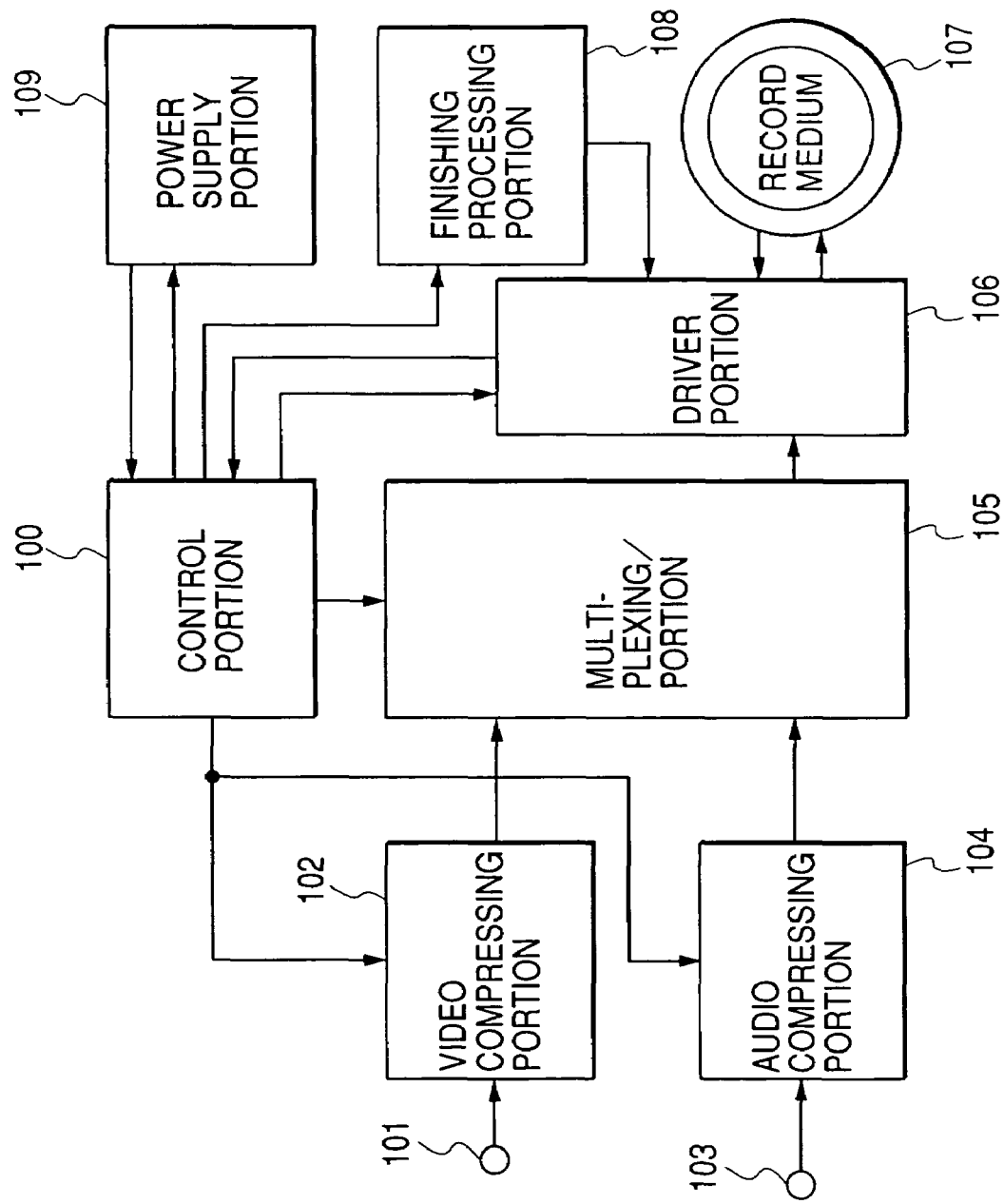
FIG. 1 is a block diagram of an video signal recording apparatus and an video signal reproducing apparatus according to the invention.

FIG. 1 is a system diagram of an embodiment of the invention. In the drawing, numeral 100 designates a control portion for controlling timings of start and finish of recording and confirming determination of a record medium and monitoring a state of power supply, numeral 101 designates an video input terminal portion of a digital video signal, numeral 102 designates an video compressing portion for compressing an video signal outputted from the video input terminal 101, numeral 103 designates an audio input terminal portion of a digital audio signal, numeral 104 designates an audio compressing portion for compressing an audio signal outputted from the audio input terminal 103, numeral 105 designates a multiplexing portion for multiplexing data outputted from the video compressing portion 102 and the audio compressing portion 104 to a system stream in conformity with standards of MPEG or the like, numeral 106 designates a driver portion for carrying out writing and reading in accordance with a medium after determining the system stream generated by the multiplexing portion 105 and the record medium, and numeral 107 designates the record medium read and written by the driver portion 106 and is DVD-RAM and DVD-R. Numeral 108 designates a finishing processing portion for switching a finishing processing by a case in which the record medium 107 is DVD-RAM and a case in which the record medium 107 is DVD-R and numeral 109 designates a power supply portion connected with a battery (charging battery, dry cell etc) or commercial alternating current power supply (hereinafter, referred to as AC power supply) for driving a video camera.

Further, the control portion 100 is for confirming determination of a record medium and monitoring a state of a power supply. However, there may be constructed a constitution providing a portion for confirming determination of a record medium (in other expression, record medium determining means for determining a kind of record medium) and a portion for monitoring a state of a power supply (in other expression, power supply monitoring means, or power supply determining means for determining a state of supplying power supply means) separately from the control portion 100.

First, an explanation will be given of a recording method.

When a user desires recording, the control portion makes the driver portion 106 confirm which of DVD-RAM or DVD-R the record medium 107 is. A result of determining the disk is stored to a flag. The flag is constituted by judge_disc_flg of 2 bits. For example, when a value of the flag is 00b, the disk is DVD-RAM, when the value is 01b, the disk is DVD-R and when the value is 10b and 11b, the disk is a medium other than the above-described. The flag is not limited to 0 bits so far as the flag can determine the disk. Thereafter, preparation of recording is started by initializing respective blocks as necessary. The disk may be determined when the disk is inserted to the system. After initializing, in order to input video data and audio data, by operating an A/D converter or the like not illustrated in FIG. 1, digital data of video is obtained from the video input terminal 101 and digital data of audio is obtained from the audio input terminal 103. The inputted digital video signal is subjected to a signal processing of brightness and color as necessary and is compressed in conformity with standards of MPEG by the video compressing portion 102. There may be installed a buffer for storing data before or after the video compressing portion as necessary. Further, the digital audio signal inputted from the audio input terminal 103 is subjected to audio compression in conformity with MPEG standards or Dolby digital (AC3) standards via a buffer or the like as necessary. In the case of recording by linear PCM, compression is not carried out. The multiplexing portion 105 generates a system stream in conformity with standards of MPEG from the video compression data and the audio compression data generated by the video compressing portion 102 and the audio compression portion 104 and also carries out packetizing in conformity with a designated format of DVD. Packetizing is carried out in conformity with video recording standards in the case of DVD-RAM and a video format of a reproduction exclusive disk in the case of DVD-R. In this case, there is frequently interposed a buffer before or after the multiplexing portion. The system stream generated by the multiplexing portion 105 is recorded to the record medium 107 via a buffer not illustrated in FIG. 1. Thereafter, when a user designates finishing (for example, press a button of the system (recording and stop recording may be carried out by the same button)), the control portion instructs the respective blocks to finish. The A/D converter not illustrated in FIG. 1 is also stopped. At this occasion, finalizing is not carried out when the system stream is recorded by DVD-RAM format. When the system stream is recorded by DVD-R, the system stream can be reproduced by an existing DVD reproduction apparatus by carrying out recording with finalizing. However, once the finalizing is carried out, data cannot be written on the disk and therefore, the finalizing is not always carried out but it is general that the user can designate whether the finalizing is executed or not. Naturally, the finalizing may be carried out automatically when recording by DVD-R has been finished.

Figure 3:
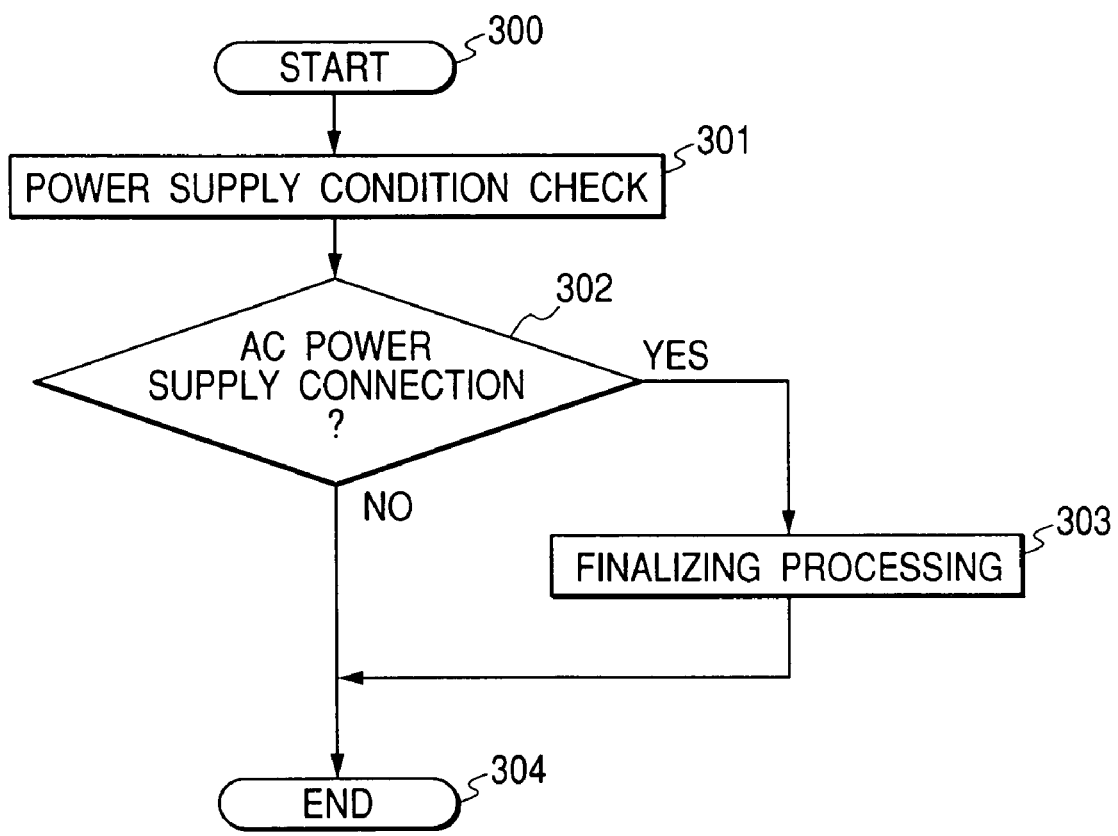
FIG. 3 is a diagram for explaining a finalizing processing flow.
Figure 8:
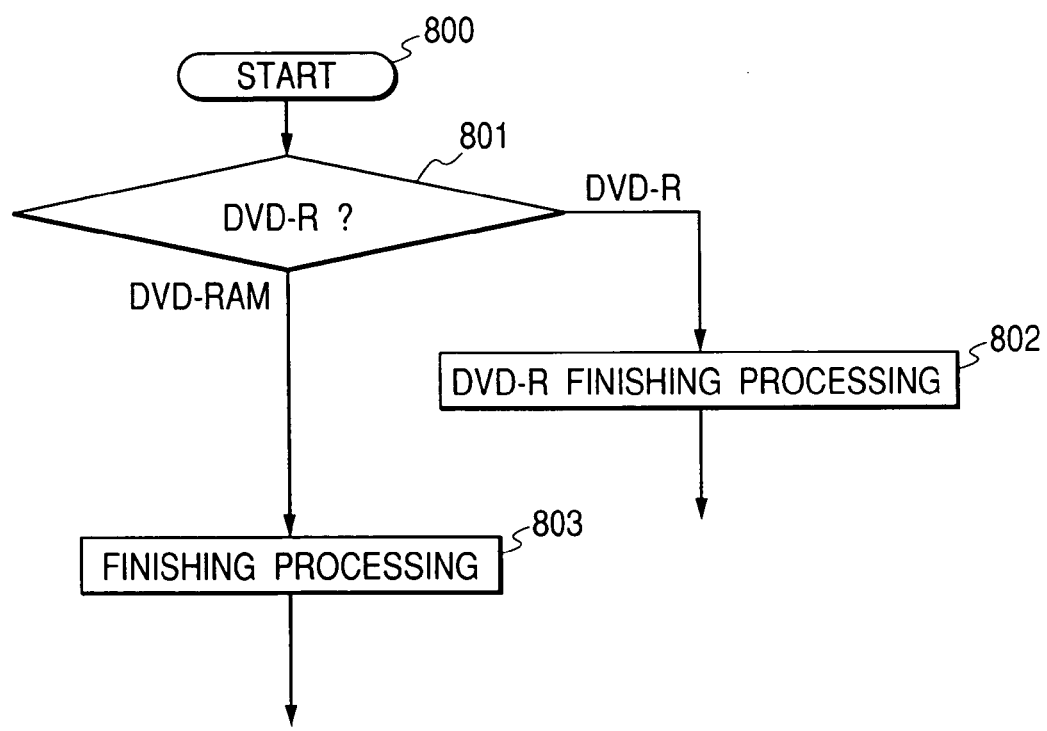
FIG. 8 is a diagram for explaining a flow of switching a finishing processing accompanied by determination of Disc.

Next, an explanation will be given of a finishing processing when a user request finalizing in reference to FIG. 1, FIG. 3 and FIG. 8. FIG. 3 shows a flow a finalizing processing and FIG. 8 explains a flow of switching a finishing processing accompanied by Disc determination.

After recording by DVD-R, in order to reproduce DVD-R by an existing DVD reproduction apparatus, a finalizing processing must be carried out. However, when a battery is dead in the finalizing processing (when a power amount necessary for carrying out the finalizing processing becomes smaller than a power amount supplied from the battery), the finalizing processing is not processed normally. At this occasion, there is a possibility that although the finalizing processing is being carried out, the finalizing processing is forcibly finished and data cannot be reproduced again so far as a finally written position is memorized. In the worst case, the disk may be destructed.

In order to avoid the above-described problem, when the user selects the finalizing processing, the control portion 100 checks a connecting state of the power supply portion 109 and a portion connected thereto. The control portion 100 stores the current connecting state of the power supply to a flag of 1 bit. The flag is designated by connect_flg, when the value is 0b, the connecting state is battery connection and when the value is 1b, the connecting state is AC power supply connection. Also the flag needs not to limit to 1 bit so far as the connecting state of a battery or an AC power supply is known.

An explanation will be given here of a processing at the finishing processing portion 108 in reference to FIG. 8.

The finishing processing portion 108 receives instruction of a finishing processing from the control portion and at the same time, receives flag connect_flg showing whether the record medium 107 is DVD-RAM or DVD-R. The processing is started by START (800) and determines which of the disks the record medium is by determining the flag for carrying out Disc determination (801). When the disk is DVD-R (801-DVD-R), a DVD-R finishing processing 802 is carried out. Further, when the disk is DVD-RAM (801-DVD-RAM), a finishing processing 803 for carrying out a finishing processing in correspondence with DVD-RAM is carried out.

The finishing processing 803 writes IFO information in conformity with video recording standards of DVD-RAM. The IFO information is information for carrying out special reproduction or the like.

Meanwhile, DVD-R finishing processing 802 writes IFO information in conformity with a reproduction exclusive video format and carries out finalizing as necessary. FIG. 3 shows a processing flow with regard to finalizing executed at DVD-R finishing processing 802 at this occasion.

In the following, an explanation will be given such that after writing the IFO information, the processing is started from START 300.

First, a connected power supply is checked at power supply connection check 301. As a result, when connect_flg flag indicating the connection state of the power supply is 0b, the connection state of battery supply and when the flag is 1b, the connection state is AC power supply connection. Based on the power supply connection check 301, when the connection is AC power supply connection (302-YES), a finalizing processing 303 is executed and when the connection state is battery connection (302-NO), the operation is finished without carrying out finalizing processing (304).

Normally, a carrying information recording apparatus such as a video camera is connected with a battery of a charging battery or the like. First of all, according to a battery (charging battery, dry cell, solar cell or the like), a suppliable power amount is limited or a suppliable power amount is changed by environmental conditions of temperature, sunshine condition and so on. Although there is present a display of a capacity of a battery in a video camera, there is a case in which accurate life of battery (remaining suppliable power amount) is not known since its display is a display to a degree of several stages. Therefore, there is frequently a case in which the battery is dead in the midst of using thereof, even when the battery seems to be usable. That is, when a battery is connected and power is supplied from the battery, power necessary for finishing the finalizing processing cannot necessarily be supplied by the battery. Therefore, when the finalizing processing is executed under the state of being supplied with power from the battery, there is a possibility that the finalizing processing cannot be executed normally due to a deficiency in the suppliable power amount of the battery. Therefore, it seems to be preferable that the finalizing processing is not executed under the state of being supplied with power from the battery.

Meanwhile, according to the AC power supply, the suppliable power amount is not limited and the suppliable power is difficult to vary even when the environmental condition of temperature or sunshine condition is changed. Therefore, when power is supplied by the AC power supply, the power amount necessary for executing the finalizing processing can be supplied and therefore, even when the finalizing processing is executed, the finalizing can be finished normally. Therefore, it seems that the finalizing processing may be executed under the state of being supplied with power from the AC power supply.

According to the embodiment, when the information recording apparatus such as video camera executes the finalizing processing, it is determined whether the power amount necessary for executing the finalizing processing can be supplied and when the necessary power amount can be supplied, the finalizing processing is executed.

With regard to the determination of whether the power amount necessary for executing the finalizing processing can be supplied, the determination is executed by determining whether the power is supplied by the battery or supplied by the AC power supply.

That is, when the power is supplied by the AC power supply, it is determined that the power amount necessary for executing the finalizing processing can be supplied and the finalizing processing is executed. Therefore, in the case of supplying power by the battery, it is determined that the finalizing processing can be executed.

When the finalizing processing is executed with the battery as power supply and under the state in which power is supplied from the battery, there is a possibility that the finalizing processing cannot be finished normally since power cannot be supplied in the midst of execution and therefore, in order to give a priority to reliability as the information recording apparatus and protection of data recorded to the record medium, the finalizing processing cannot help being prevented from executing when the battery constitutes the power supply.

Meanwhile, under the state in which the AC power supply is connected to the information recording apparatus such as a video camera and power is supplied from the AC power supply, in the normal case, the power necessary for the finalizing processing continues to be supplied always from the AC power supply and therefore, the finalizing processing can normally be finished, data recorded to the information recording apparatus is protected and promotion of reliability of the information recording apparatus is achieved.

As described above, according to the embodiment, when the user intends to execute finalizing, by monitoring the power supply connection state and preventing the finalizing from being permitted by other than the AC power supply, a dangerous state of forcibly finishing the finalizing processing in the midst of execution can be avoided.

Further, although according to the embodiment, an explanation has been given by taking an example of the finishing processing with regard to DVD-R, the embodiment is applicable to a record medium necessitating a finalizing processing after recording and may be executed with regard to, for example, DVD-RAM.

Figure 4:
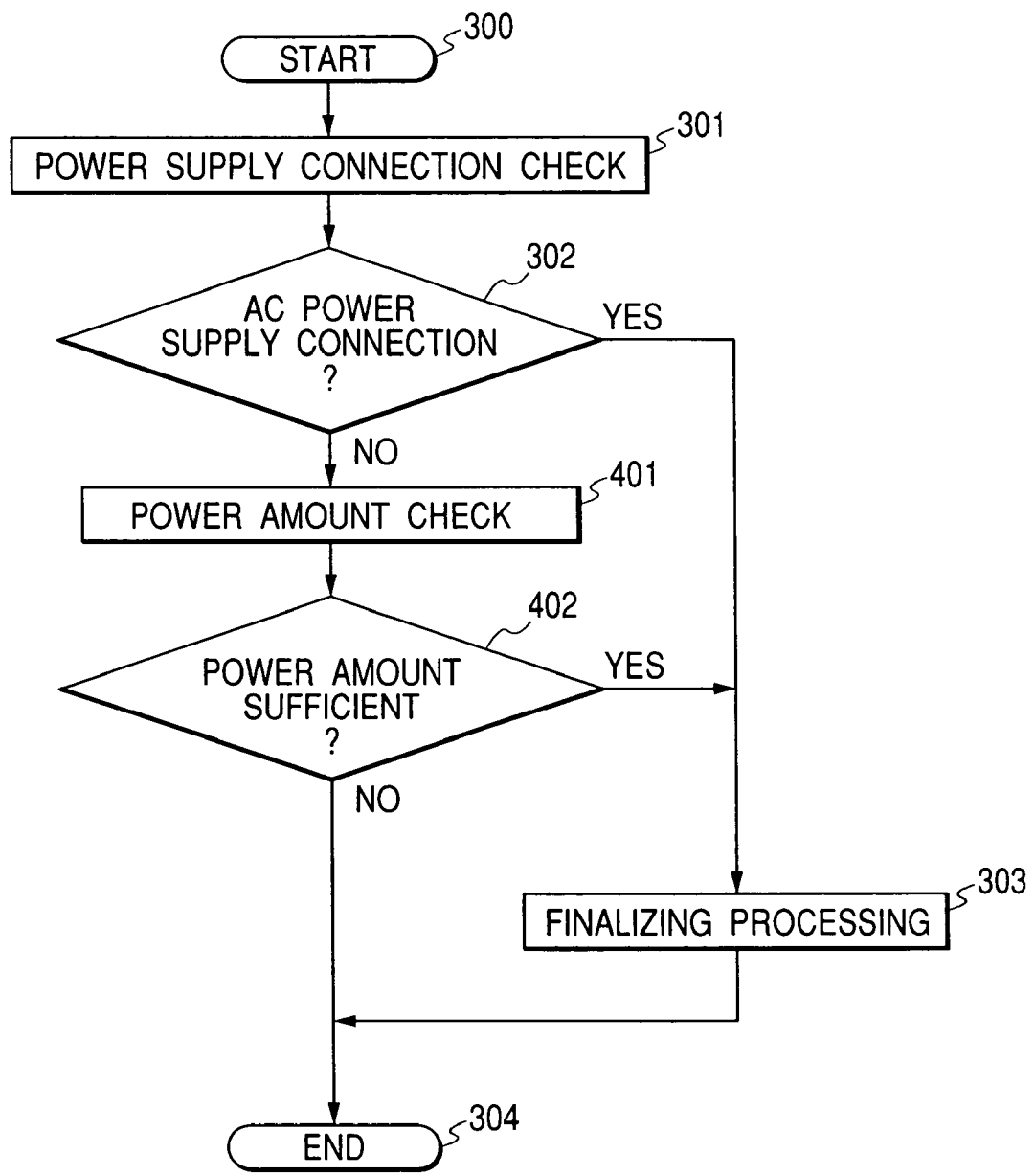
FIG. 4 is a diagram for explaining a finalizing processing flow.

Next, an explanation will be given of an embodiment of executing the finalizing processing even when power is supplied by other than AC power supply as a second embodiment in reference to FIG. 1 and FIG. 4. FIG. 4 also shows a flow of the finalizing processing and an explanation will be omitted with regard to portions duplicated with those in FIG. 3. The system constitution is similar to that of the first embodiment. According to the above-described first embodiment, by monitoring a portion thereof connected as the power supply, determining supply of power and executing the finalizing processing when the AC power supply is connected, the case in which the finalizing processing cannot be executed normally, can be avoided.

However, in the case of a portable type information recording apparatus such as a video camera, picture is frequently taken outdoors generally and in that case, the apparatus is not used while being connected to the AC power supply. In that case, according to the first embodiment, there is an inconvenient case in which the finalizing processing cannot be executed since the AC power supply is not connected thereto. For example, depending on a user, there also is a case in which the user desires the finalizing processing even outdoors since the disk has been recorded fully.

Here, the second embodiment improves the inconvenient point and is an embodiment for enabling to execute the finalizing processing even when the battery is connected. According to the second embodiment, power supply connected at power supply connection check 301 is checked and when the AC power supply is connected (302-YES) and thereafter, processings similar to those in the first embodiment are executed.

Meanwhile, as a result of the power supply connection check (301), in the case of the battery connection (302-NO), a power amount suppliable by a battery connected to the power supply portion 109 is checked (401), when a power amount necessary for executing the finalizing processing can be supplied (for example, the power amount suppliable by the battery is larger than a power amount necessary for executing the finalizing processing) (402-YES), the finalizing processing 303 is executed and in contrast thereto, when the power amount necessary for executing the finalizing processing cannot be supplied (402-NO), the operation is finished without executing the finalizing processing (304).

According to the embodiment, even when the battery is connected, in the case in which the power amount supplied from the battery is larger than the power amount necessary for executing the finalizing processing, the finalizing processing is executed.

Here, an explanation will be given of other point of consideration when the battery is used and an explanation will be given of a new technology dealing therewith.

That is, as described above, a suppliable power amount of a battery (charging battery, dry cell, solar cell or the like) is limited and the battery is provided with a certain characteristic in the case of changing the suppliable power amount depending on a change in environmental conditions such as temperature, sunshine condition and so on.

Therefore, even when at time point of starting the finalizing processing, the power amount stored in the battery is large and the power amount supplied from the battery is larger than the power amount necessary for executing the finalizing processing, depending on the change in the environmental conditions, at certain time point, there is a possibility of bringing about a case in which supplied power becomes smaller than power necessary for executing the finalizing processing and the processing cannot be executed normally.

In this case, it is not sufficient only to detect and determine a magnitude of a power amount of the battery remaining undischarged, that is, a power amount which can be supplied from the battery, is larger than a power amount necessary for executing the finalizing processing. That is, it is necessary to additionally execute a processing of detecting and determining whether necessary power can stably continue supplying in the midst of executing the finalizing processing. In other words, in addition to checking whether a total power amount necessary for the finalizing processing can be supplied, it is also necessary to determine whether power necessary for continuing to process the finalizing processing at every moment can stably be continued to supply until finishing the processing by the connected battery.

Also in this case, stability of power supplied from the battery is detected and when the power necessary for the finalizing processing can stably be supplied, the finalizing processing may be executed. Conversely, even when the power amount suppliable by the battery can supply the total power amount necessary for the finalizing processing, in the case in which the power necessary for continuing to process the finalizing processing at every moment cannot stably continue supplying, it is determined that the finalizing processing is not executed.

Figure 11:
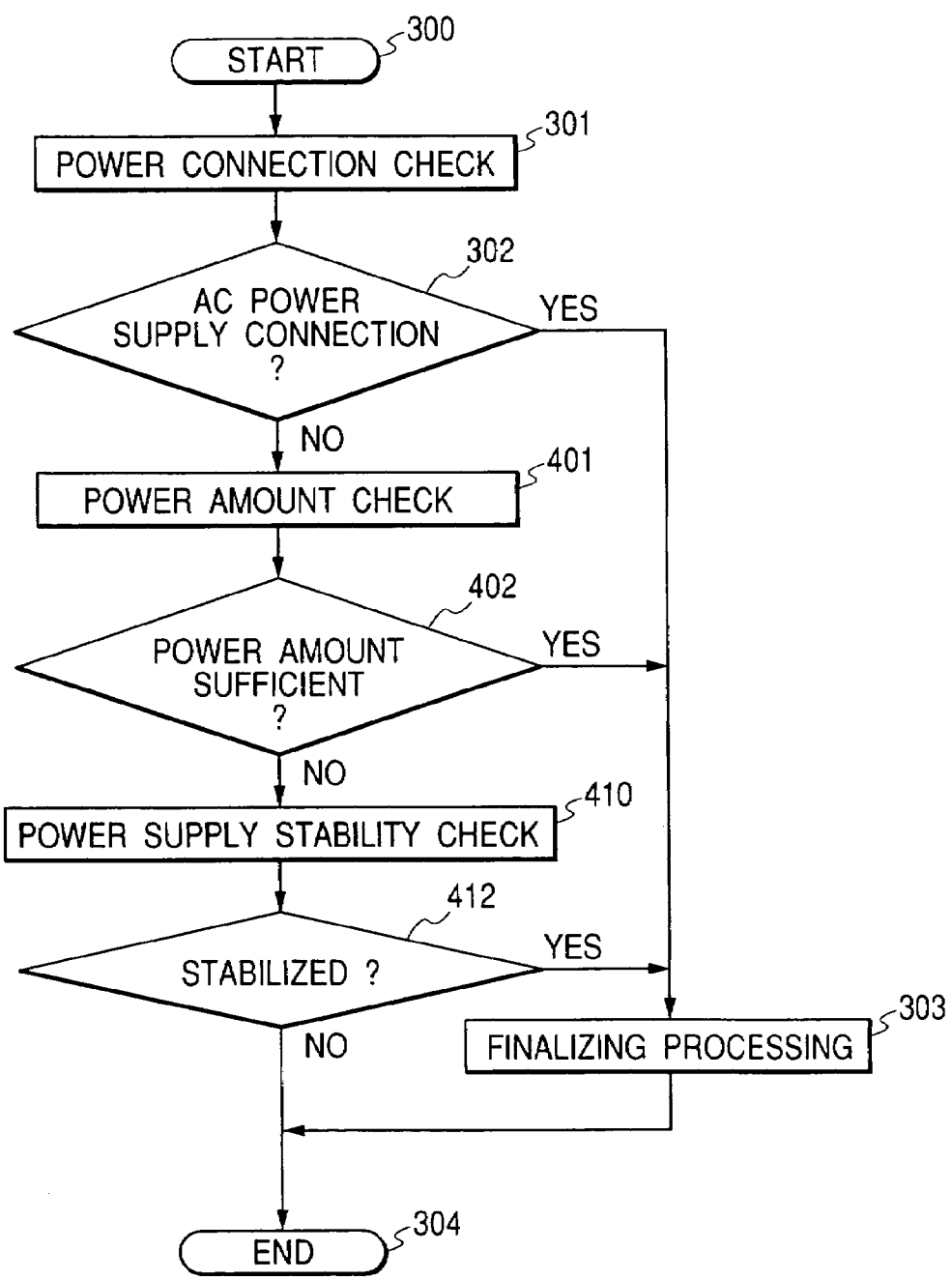
FIG. 11 is a diagram for explaining a finalizing processing flow.

FIG. 11 explains the processing. FIG. 11 adds power supply stability check 410 for detecting stability of supplied power to the processing of FIG. 4 and an explanation will be given of the added processing.

That is, in FIG. 11, stability of suppliable power is checked (410), when a power amount necessary for executing the finalizing processing can stably be supplied (412-YES), the finalizing processing 303 is executed and in contrast thereto, when the power amount necessary for executing the finalizing processing cannot be supplied (412-NO), the operation is finished without executing the finalizing processing (304).

Further, in detecting or determining that power necessary for the finalizing processing can stably be supplied, when a change of supplied power over time is stable, it may be determined that the power can stably be supplied. For example, by continuously or discretely referring to power supplied from the battery over time, a state and a characteristic of the change of the supplied power are calculated and based on the state and the characteristic of the change, it can be detected or determined that the power necessary for the finalizing processing can stably be supplied.

Further, in detecting or determining stability of power supply based on the state and the characteristic of the change, the detection or determination may be executed by referring to the characteristic of the battery (including charging characteristic or the like) (in this case, it may be necessary for a user to detect or determine a kind of a connected battery or to set the kind of the battery in initial setting), or providing a sensor or means for measuring the environmental condition such as measuring or referring sunshine condition by a sensor with regard to light.

Further in relation to the matter explained in the first embodiment, according to the AC power supply, a suppliable power amount is not limited and normally, power can be supplied stably and a change in supplied power is difficult to bring about by the environmental conditions as in the battery.

Therefore, when power is supplied from the AC power supply, in executing the finalizing processing, even in consideration of a variation of power supplied on an average and stability of power supply, data recorded in the information recording apparatus is protected, further, promotion of reliability of the information recording apparatus is achieved.

Figure 7:
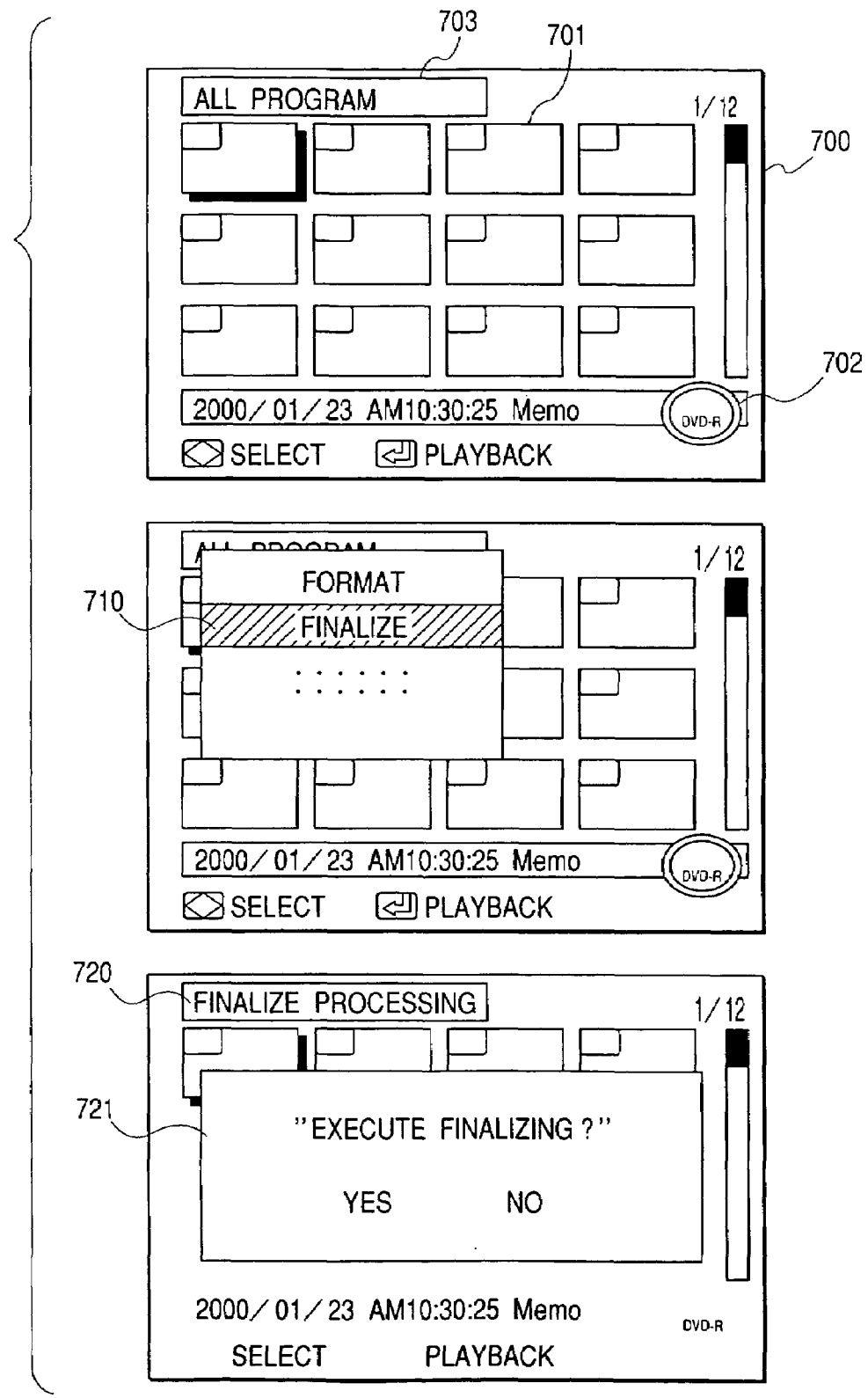
FIG. 7 is a view for explaining display screens.

Next, an explanation will be given of an embodiment of informing a processing content when the finishing processing is executed in the first embodiment as a third embodiment in reference to FIG. 1, FIG. 5 and FIG. 7.

The system constitution is the same as that of the first embodiment. Further, FIG. 5 shows a flow adding confirmation screen display 500 and 501 to FIG. 3. FIG. 7 shows operation GUI of the system. Numeral 701 designates a sum nail video. The sum nail video is an video contracting recorded videos. An initial screen is displayed such that what is recorded is immediately known. Numeral 702 designates a portion displaying a kind of record medium. Numeral 703 designates a display showing a current state. All program indicates all of recorded imaged in this case.

When a user intends to execute finalizing, a pulldown menu 710 is displayed on a screen 700. An item of finalize is selected from the pulldown menu 710. Then, an item of processing is displayed in a display area 720, it is known that the operation proceeds to the finalizing processing, further, at the same time, a confirmation screen of finalizing is displayed. The confirmation screen is designated by numeral 721. A message stating "execute finalizing?" of the confirmation screen 721 is not limited to the above-described message so far as a user is expedited to confirm such that "execute finalizing after going back home?" or "truly execute?". The user can see the confirmation screen 721 only when the finalizing is executed.

Figure 5:
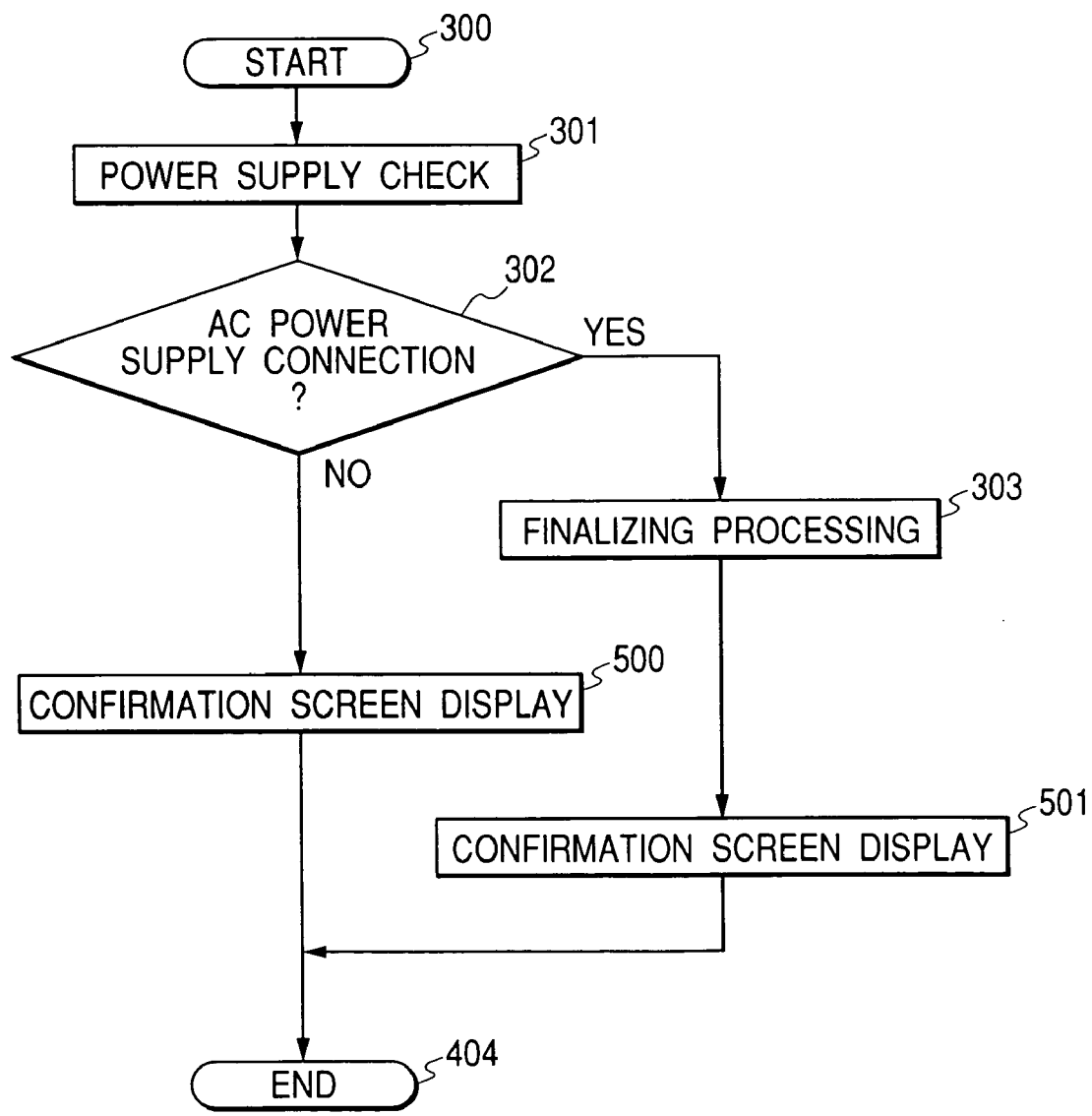
FIG. 5 is a diagram for explaining a finalizing processing flow.

Confirmation screen display 501 of FIG. 5 displays the confirmation screen 721. When the user intends to stop the finalizing here, the user may select No and select Yes when the user executes the finalizing. Further, when the finalizing is not executed since the AC power supply is not connected, it is not necessary to display "execute finalizing?" of the confirmation screen 721 or a message informing that to the user may be displayed. When the message is informed to the user, the message is informed by the confirmation screen display 500 of FIG. 5. For example, the message may be a message expediting the user to connect the AC power supply such as "finalizing is not executed since AC power supply is not connected" or "please connect AC power supply" or the like.

As has been explained above, in the finalizing processing the operability is promoted by informing the processing content to the user.

Next, an explanation will be given of an embodiment of informing the processing content when the finishing processing in the second embodiment is executed also in a fourth embodiment in reference to FIG. 1, FIG. 6 and FIG. 7.

Figure 6:
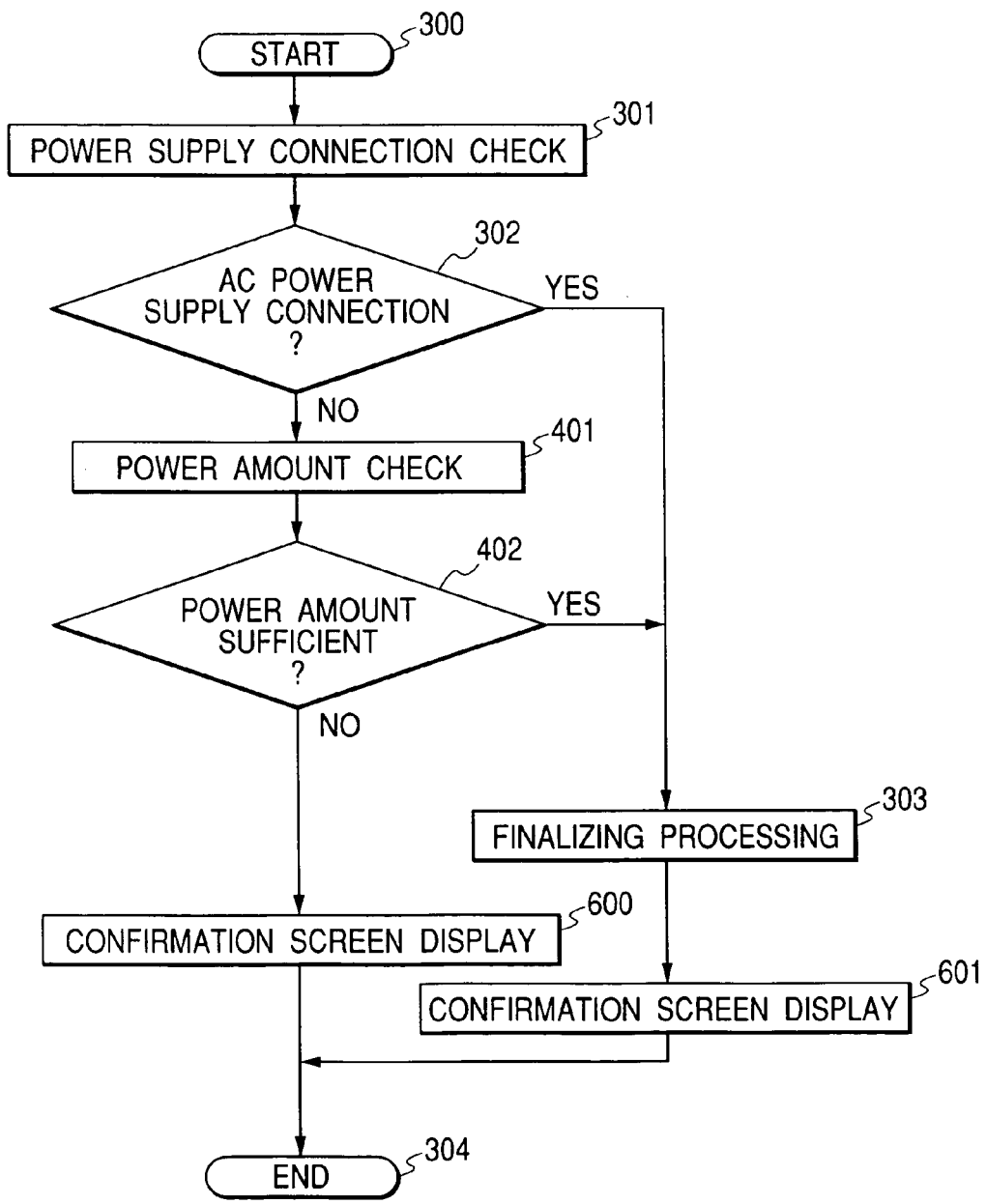
FIG. 6 is a diagram for explaining a finalizing processing flow.

The system constitution is the same as that of the first embodiment, further, FIG. 6 shows a flow adding confirmation screen display 600 and 601 to FIG. 4. FIG. 7 shows operation GUI of the system. Numeral 701 designates a sum nail video. The sum nail video is an initial screen of inputted video. Numeral 702 designates a portion of displaying a kind of a record medium. Numeral 703 designates a display showing a current state. When a user intends to execute finalizing, the pulldown menu 710 is displayed on the screen 700. The user selects the item of finalizing from the pulldown menu 710. Then, it is known that the operation proceeds to the finalizing processing as designated by numeral 720 and at the same time, the confirmation screen of finalizing is displayed. The confirmation screen is designated by numeral 721. The expression stating "execute finalizing?" of the confirmation screen 721 may be displaced by any other expression such that "execute finalizing after going back home?" or "truly execute?" so far as expression makes the user confirm thereof. The user can see the confirmation screen 721 only when the finalizing is executed. Confirmation screen display 610 of FIG. 6 displays confirmation screen 721. When the user intends to stop finalizing, the user may select No and may select Yes when the user executes finalizing. Further, when the finalizing is not executed since the power amount of the battery is smaller than the power amount necessary for executing the finalizing processing, a display informing that to the user may be displayed. When such display is displayed, confirmation screen display 600 of FIG. 6 displays the display. For example, the display is such that "finalizing is not executed since capacity of battery is deficient", "please charge battery", or "please execute finalizing processing after interchanging battery to new one", "connect AC power supply" or the like.

As has been explained above, in the finalizing processing, the operability is promoted similar to the third embodiment by informing the processing content to the user.

Next, an explanation will be given of embodiments with regard to a video camera and a DVD recorder as information recording/reproducing apparatus integrated with the system constitution explained in the first through the fourth embodiments.

Figure 9:
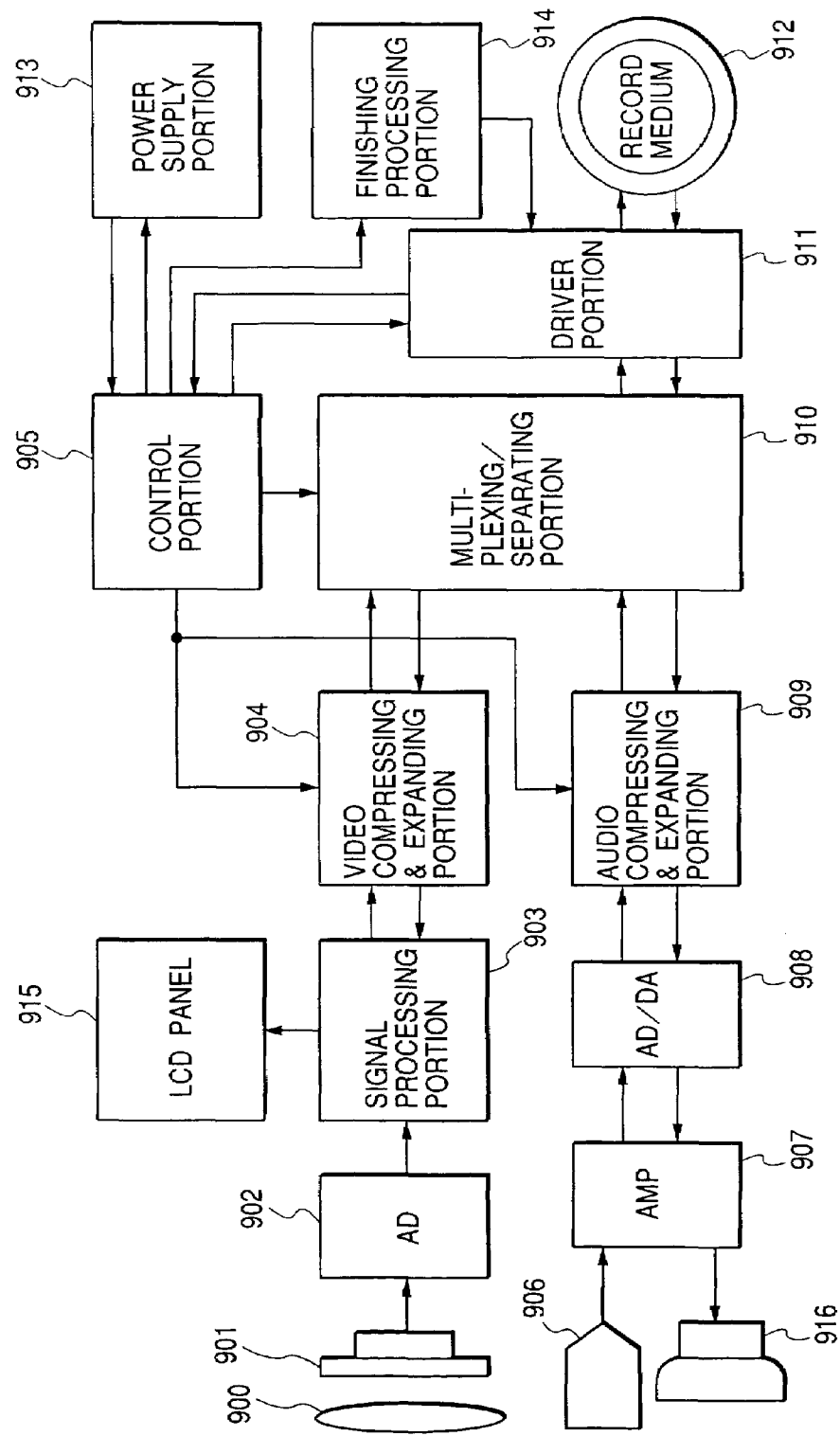
FIG. 9 is a diagram for explaining a video camera capable of recording DVD-RAM and DVD-R.

First, an explanation will be given of a video camera capable of recording two optical disks of DVD-RAM and DVD-R as a fifth embodiment in reference to FIG. 9.

Numeral 900 designates a lens. Numeral 901 designates CCD for converting an optical signal provided via the lens 900 into an electric signal. Numeral 902 designates an A/D converter for converting the analog electric signal converted by CCD 901 into a digital signal, numeral 903 designates a signal processing portion for converting the digital signal converted by the A/D converter 902 into a format capable of executing compression of MPEG or executing format conversion to NTSC in reproduction, and numeral 904 designates an video compressing and expanding portion for subjecting an video signal converted by the signal processing portion 903 to compression of MPG. Further, in reproduction, a compressed signal is expanded and transmitted to the signal processing portion 903. Numeral 906 designates a microphone, numeral 907 designates an AMP portion for amplifying an audio signal from the microphone 906, numeral 908 designates A/D and D/A converter for converting the audio signal amplified by the AMP portion 907 into a digital signal, numeral 915 designates an LCD panel such as a liquid crystal monitor and numeral 916 designates a speaker.

Further, a control portion 905, a driver portion 911, a record medium 912, a power supply portion 913 and a finalizing processing portion 914 execute processings similar to those of the first through the fourth embodiments. Although portions 904 and 909 execute processings similar to those of the first through the fourth embodiment, the portions also execute expansion in reproduction. Although a portion 910 executes multiplexing processing similar to those in the first through the fourth embodiments, the portion may separate a packetized compression signal in reproduction.

The video signal inputted form the lens 900 is inputted to the AD converter 902 via CCD 901 and converted here into the digital signal. The converted digital signal is converted into the format capable of executing MPEG recording by the signal processing portion 903 and is subjected to MPEG compression by the video compressing and expanding portion. The video compressing and expanding portion corresponds to the video compressing portion 102 of FIG. 1. Compressed data is expanded also in reproduction. Further, the audio signal inputted from the microphone 906 is amplified by AMP 907 and thereafter converted into the digital signal by the A/D and D/A converter 908. The converted digital signal is subjected to compression of MPEG or Dolby digital by the audio compressing and expanding portion 909. The audio compressing and expanding portion correspond to the audio compressing portion 104 of FIG. 1. Compressed data is expanded also in reproduction. The processings of the video compressing and expanding portion 904 and the audio compressing and expanding portion 909 and thereafter, are as have been explained in the first through the embodiments.

Next, an explanation will be given of processings in reproduction in reference to FIG. 9.

When a user instructs reproduction, the driver portion 911 determines whether the record medium is DVD-RAM or DVD-R, reads data in accordance with the media and transmits the data to the multiplexing/separating portion 910 via a buffer or the like. The transmitted data is packetized and accordingly, data is separated, an elementary stream of video is transmitted to the video compressing and expanding portion 904 and an elementary stream of audio is transmitted to the audio compressing and expanding portion 909. The expanded video signal is converted into a format such as NTSC and thereafter displayed on the LC panel 915.

The audio is expanded by the audio compressing and expanding portion 909, thereafter converted into an analog audio signal by the A/D and D/A converter 908 and is amplified at the AMP 907 portion. the amplified audio signal is outputted via the speaker 916. Synchronization of video and audio at this occasion is carried out by the multiplexing/separating portion 910.

As has been explained above, it can be prevented that the finalizing processing cannot be processed normally, the optical disk cannot reproduce signals or the optical disk is destructed by switching finalizing record in accordance with a state of connecting power supply or capacity of a battery in recording by DVD-R by using a video camera capable of recording two optical disks of DVD-RAM and DVD-R. Further, by displaying an alarm message, the processing content currently executing can be known or what to be executed next is determined and therefore, the operability is also promoted.

Figure 10:
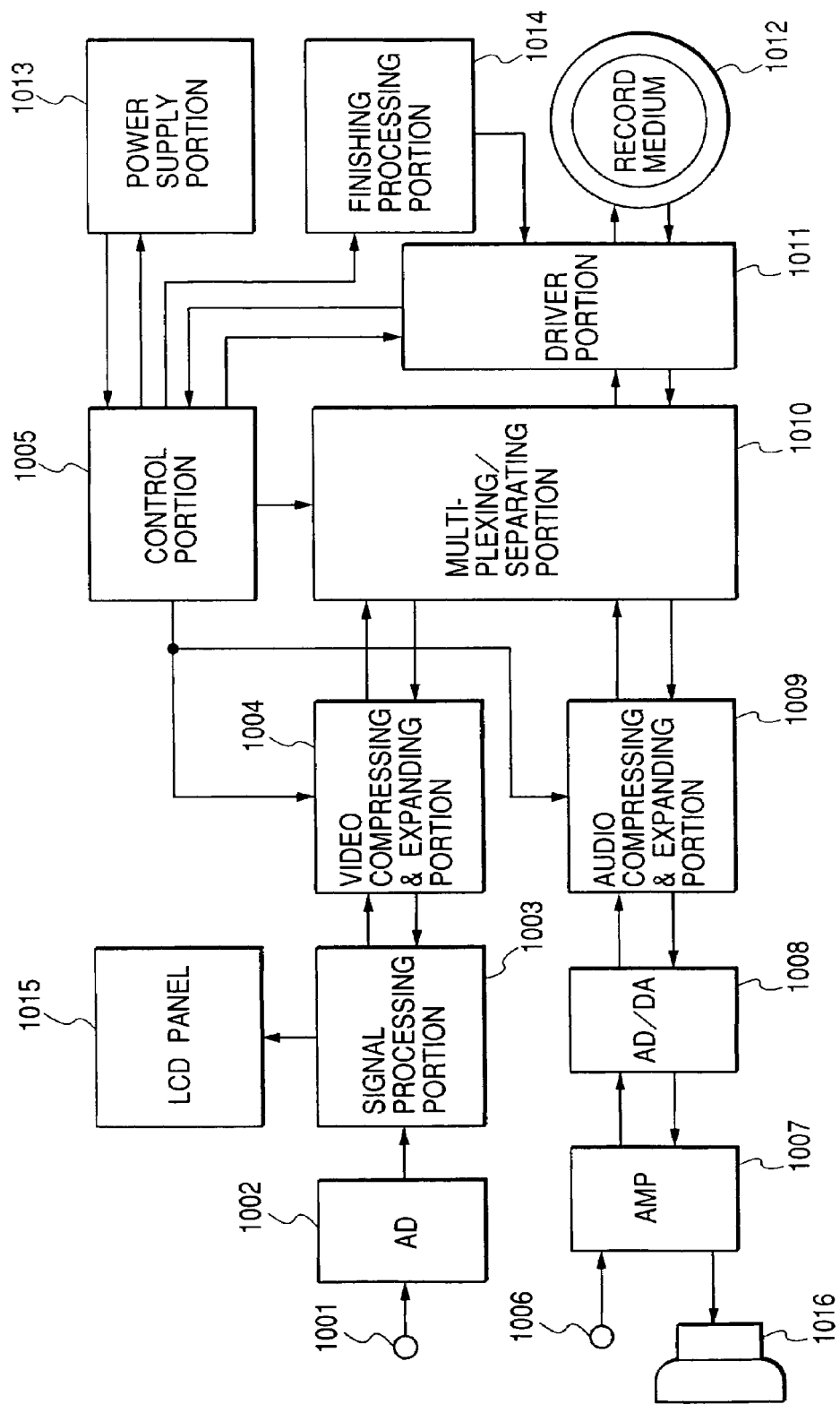
FIG. 10 is a diagram for explaining a video recorder capable of recording DVD-RAM and DVD-R.

Next, an explanation will be given of a video recorder capable of recording two optical disks of DVD-RAM and DVD-R as a sixth embodiment in reference to FIG. 10. A recorder mentioned here is not necessarily limited to a portable type capable of carrying or a carrying type but includes a stationary deck.

Numeral 1001 designates an video input terminal of line input or the like, numeral 1002 designates an A/D converter for converting an analog electric signal from the video input terminal 1001 into a digital signal, numeral 1003 designates a signal processing portion for converting the digital signal converted by the A/D converter 1002 into a format capable of executing compression of MPEG and executing format conversion to NTSC or the like in reproduction, and numeral 1004 designates an video compressing and expanding portion for subjecting an video signal converted by the signal processing portion 1003 to compression of MPEG.

Further, in reproduction, a compressed signal is expanded and transmitted to the signal processing portion 1003. Further, numeral 1006 designates an audio input terminal for audio input, numeral 1007 designates an AMP portion for amplifying an audio signal from the audio input terminal 1006, numeral 1008 designates an A/D and D/A converter for converting the audio signal amplified by the AMP portion 1007 into a digital signal, numeral 1015 designates an LCD panel such as a liquid crystal monitor and numeral 1016 designates a speaker. Further, a control portion 1005, a driver portion 1011, a record medium 1012, a power supply portion 1013 and a finalizing processing portion 1014 execute processings similar to those of the first through the fourth embodiments. Although portions 1004 and 1009 execute processings similar to those of the first through the fourth embodiments, the portions also execute expansion in reproduction. Although a portion 1010 executes a multiplexing processing similar to those of the first through fourth embodiments, the portion may separate a packetized compression signal in reproduction.

The video signal inputted from the video input terminal 1001 is inputted to the AD converter 1002 and converted here into the digital signal. The converted digital signal is converted into the format capable of executing MPEG recording by the signal processing portion 1003 and subjected to MPEG compression by the video compressing and expanding portion 1004. The video compressing and expanding portion 1004 corresponds to the video compressing portion 102 of FIG. 1. Compressed data is expanded also in reproduction. Further, the audio signal inputted from the audio input terminal 1006 is amplified by AMP 1007 and thereafter converted into the digital signal by the A/D and D/A converter 1008: The converted digital signal is subjected to compression of MPEG or Dolby digital by the audio compressing and expanding portion 1009. The audio compressing and expanding portion 1009 corresponds to the audio compressing portion 104 of FIG. 1. Compressed data is expanded also in reproduction. Processings of video compressing and expanding portion 1004 and the audio compressing and expanding portion 1009 and thereafter, are as have been explained in the first through the fourth embodiments.

Next, an explanation will be given of a processing in reproduction in reference to FIG. 10.

When a user instructs reproduction, the driver portion 1011 determines whether the record medium is DVD-RAM or DVD-R, reads data in accordance with the media and transmits the data to the multiplexing/separating portion 1010 via a buffer or the like. The transmitted data is packetized and therefore, the data is separated, an elementary stream of video is transmitted to the video compressing and expanding portion 1004 and an elementary stream of audio is transmitted to the audio compressing and expanding portion 1009. The expanded video signal is converted into a format of NTSC or the like by the signal processing portion 1003 and is displayed on the LCD panel 1015.

Audio is expanded by the audio compressing and expanding portion 1009, thereafter converted into an analog audio signal by the A/D and D/A converter 1008 and is amplified by the AMP 1007 portion. The amplified audio signal is outputted via the speaker 1016. Synchronization of video and audio at this occasion is executed by the multiplexing/separating portion 1010.

As has been explained above, it can be prevented that the finalizing processing cannot be processed normally in the midst of the processing or forcibly finished, for example, the disk is destructed by switching finalizing record in accordance with the state of connecting power supply or capacity of a battery in recording by DVD-R by using a video recorder capable of recording two optical disks of DVD-RAM and DVD-R. Further, the operability is also promoted by displaying an alarm message.

Further, although according to the above-described embodiments, an explanation has been given by taking an example of the finishing processing with regard to DVD-R, the embodiment is applicable to a record medium necessitating a finishing processing after recording and may be executed with regard to, for example, DVD-RAM.

Further, the invention can be executed in an information recording apparatus for recording signals from a video camera (camera integral type information recording apparatus), a portable type information recording apparatus and a stationary type information recording apparatus although an explanation thereof has been given in the embodiments.

Further, the constitution described in Japanese Patent Laid-Open No. 54518/1993 of the reference example may be used along with the invention.

Here, an explanation will be given of other effect by the embodiments according to the invention.

When the finalizing processing is executed after recording a write once type record medium, the record medium cannot be taken out during a time period of the finalizing processing and accordingly, the record medium cannot be recorded and is at standby.

Depending on adopted standards with regard to recording, data is written to an unrecorded area in the finalizing processing. Therefore, the shorter the time period of recording information, the larger the unrecorded area, the larger the amount of writing data to the area in the finishing processing, time is taken and the record medium is made to be at standby. Therefore, the more the time is taken in the finishing processing, the more prolonged is a time period of being at standby until the record medium is interchanged to a new one and recording is started.

However, in the case in which a portable type information recording apparatus such as a camera is applied with the above-described embodiment for executing the finishing processing when the AC power supply is connected, the portable type information recording apparatus such as a camera is normally supplied with power by a battery and the finalizing processing is not executed since the AC power supply is not connected thereto. Therefore, there is achieved an effect of dispensing with operation at standby for writing data in the finishing processing.

Further, it can be avoided by the above-described embodiment that additional recording cannot be executed as a result of finishing processing by, for example, erroneous instruction although the write once type record medium is provided with a large unrecorded area (that is, there remains a lot of recordable area) and the write once type record medium cannot be used effectively.

The invention can provide the information recording apparatus capable of switching the finishing processing in accordance with the kind of the record medium (rewritable time, write once type record media).

Further, when the information recording apparatus executes the finishing processing, it is determined whether the power amount necessary for executing the finishing processing can be supplied and when the necessary power amount can be supplied, the finishing processing is executed and accordingly, the finishing processing can normally be executed.

Therefore, it can be avoided that the finishing processing is forcibly finished although the finishing processing is being executed and information recorded on the disk cannot be reproduced or the disk is destructed, data recorded in the information recording apparatus can be protected and promotion of reliability of the information recording apparatus can be achieved. The finishing processing can normally be executed by the invention and therefore, the invention is very useful in the case of a write once type record medium capable of writing data only once such as DVD-R.

Further, the invention is applicable not only to the write once type record medium but also to a record medium necessitating the finishing processing after recording and is useful also to the rewritable record medium such as DVD-RAM.

Further, as has been explained in the embodiments according to the invention, the invention can provide the information recording apparatus of, for example, a camera integral type integrally mounted with DVD-RAM and DVD-R.

What is claimed is:

1. An information recording apparatus for recording information to a write once type record medium, said information recording apparatus comprising:
   driver means for writing and reading the information to and from a write once type recording medium;
   finishing processing means for executing a finishing processing based on a method of recording the information to the write once type recording medium via the driver means;
   power supply means for supplying power to the information recording apparatus;
   power supply determining means for determining a state of supplying the power supply means; and
   controlling means for controlling the information recording apparatus;
   wherein the power supply determining means determines whether the power is supplied by a battery or supplied by a commercial alternating current power supply; and
   wherein when the power is supplied by the commercial alternating current, the finishing processing means executes the finishing processing.

2. An information recording apparatus for recording information to a write once type record medium, said information recording apparatus comprising:
   driver means for writing and reading the information to and from a write once type recording medium;
   finishing processing means for executing a finishing processing based on a method of recording the information to the write once type recording medium via the driver means;
   power supply means for supplying power to the information recording apparatus;
   power supply determining means for determining a state of supplying the power supply means; and
   controlling means for controlling the information recording apparatus;
   wherein the power supply determining means determines whether the power is supplied by a battery or supplied by a commercial alternating current power supply; and
   wherein when the power is supplied by the battery, the finishing processing means does not execute the finishing processing.

* * * * *